United States Patent
de la Iglesia et al.

(10) Patent No.: US 8,713,252 B1
(45) Date of Patent: Apr. 29, 2014

(54) TRANSACTIONAL CONSISTENCY SCHEME

(75) Inventors: Erik de la Iglesia, Sunnyvale, CA (US); Som Sikdar, Sunnyvale, CA (US); Ross Becker, Sunnyvale, CA (US)

(73) Assignee: Violin Memory, Inc., Santa Clara, CA (US)

( * ) Notice: Subject to any disclaimer, the term of this patent is extended or adjusted under 35 U.S.C. 154(b) by 589 days.

(21) Appl. No.: 12/773,681

(22) Filed: May 4, 2010

Related U.S. Application Data (60) Provisional application No. 61/175,901, filed on May 6, 2009.

(51) Int. Cl.
*G06F 13/00* (2006.01)
*G06F 13/28* (2006.01)

(52) U.S. Cl.
USPC .............................. 711/112; 710/52; 710/56

(58) Field of Classification Search
USPC ................ 711/112, E12.002; 710/52, 56
See application file for complete search history.

(56) References Cited

U.S. PATENT DOCUMENTS

| | | | |
|---|---|---|---|
| 5,954,796 A | 9/1999 | McCarthy et al. | |
| 6,041,366 A | 3/2000 | Maddalozzo et al. | |
| 6,401,147 B1* | 6/2002 | Sang et al. | 710/56 |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,742,084 B1 | 5/2004 | Defouw et al. | |
| 6,789,171 B2 | 9/2004 | Desai et al. | |
| 6,810,470 B1* | 10/2004 | Wiseman et al. | 711/163 |
| 7,017,084 B2 | 3/2006 | Ng et al. | |
| 7,089,370 B2 | 8/2006 | Luick | |
| 7,110,359 B1* | 9/2006 | Acharya | 370/235 |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1* | 3/2002 | Finn et al. | 710/60 |
| 2002/0175998 A1 | 11/2002 | Hoang | |
| 2002/0194434 A1 | 12/2002 | Kurasugi | |
| 2003/0012204 A1 | 1/2003 | Czeiger et al. | |
| 2003/0167327 A1 | 9/2003 | Baldwin et al. | |
| 2003/0177168 A1 | 9/2003 | Heitman et al. | |
| 2003/0210248 A1 | 11/2003 | Wyatt | |
| 2004/0128363 A1 | 7/2004 | Yamagami et al. | |
| 2004/0146046 A1 | 7/2004 | Jo et al. | |

(Continued)

OTHER PUBLICATIONS

"What is a driver", http://www.webopedia.com/TERM/D/driver.html, retreived on Nov. 4, 2013.*

(Continued)

*Primary Examiner* — Edward Dudek, Jr.
(74) *Attorney, Agent, or Firm* — Brinks Gilson Lione (57) ABSTRACT

A proxy manages write operations between devices that initiate write operations and one or more storage devices that store data for the write operations. A write log buffers the data for the write operations while the proxy waits for acknowledgments back from the storage device. The proxy is configured to copy at least some of the data from the write log into an overflow log when the data from the write operations is about to overflow the write log. The proxy device is further configured to maintain data consistency by delaying or blocking read operations until associated data from previously received write operations is acknowledged by the storage device.

18 Claims, 8 Drawing Sheets

(56) References Cited

U.S. PATENT DOCUMENTS

| | | |
|---|---|---|
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1* | 1/2006 | Yanai et al. .................... 714/5 |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1* | 12/2006 | Paulson et al. ................. 710/39 |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1 | 8/2012 | Hooker et al. |

OTHER PUBLICATIONS

Stolowitz Ford Cowger Listing of Related Cases, Feb. 7, 2012.

Rosenblum, Mendel and Ousterhout, John K., The LFS Storage Manager. Proceedings of the 1990 Summer Usenix. 1990 pp. 315-324.

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

* cited by examiner

TRANSACTIONAL CONSISTENCY SCHEME

The present application claims priority to Provisional Patent Application Ser. No. 61/175,901 filed May 6, 2009 which is incorporated by reference in its entirety.

BACKGROUND

A proxy is a device that acts as an intermediary between two or more devices. The proxy may provide improved performance, load balancing, management, or addition functionality. In most storage deployments, a partitioning exists between devices that operate as initiators and devices that operate as targets for the initiators. Targets are intended to provide access to storage whereas initiators allow access to that storage by applications. A deployed proxy is inserted between selected initiators and targets. The initiators and targets are then said to be proxied by the proxy device, or connected through said proxy.

Proxy behavior can be defined as either transparent or non-transparent. Initiator and target devices see no operational difference in their interaction before and after a transparent proxy is installed. Initiators and targets connected through a non-transparent proxy may see no operational difference but will incur some behavioral difference, especially concerning the temporal sequence of storage access events. In some cases, it may be desired to configure the proxy so that the initiators and targets cannot detect the presence of the proxy. Of particular concern is the ability to maintain a proxied connection between an initiator and a target while ensuring correctness of the communication protocol so that all operations provide identical results for proxied and non-proxied configurations.

DETAILED DESCRIPTION OF THE DRAWINGS

Figure 1:
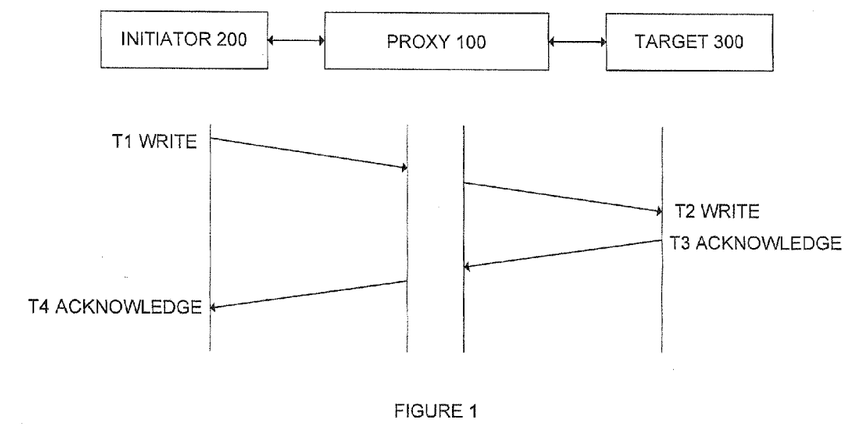
FIG. 1 is a timing diagram for a transparent proxy.

Referring to FIG. 1, a transparent proxy 100 receives a write operation/message from an initiator 200 at time T1. The transparent proxy 100 forwards the write at time T2 to a target 300 and waits for and receives an acknowledgement back from the target at time T3. Only after receiving the acknowledgement from target 300 does the transparent proxy 100 forward an acknowledgement at time T4 back to the initiator 200. The initiator 200 and the target 300 communicate in substantially the same manner regardless of whether the transparent proxy 100 is inserted or not inserted. One limitation of the transparent proxy 100 is that the number of write operations is limited by the delay between time T1 when the initiator 200 sends the write instruction and time T4 when the initiator 200 receives the acknowledgement back from the proxy 100. An advantage of the transparent deployment is that the end-to-end acknowledgement is functionally identical to the deployment before the insertion of the proxy. This assures data consistency without imposing significant burden on the proxy at the cost of a longer round-trip delay.

Figure 2:
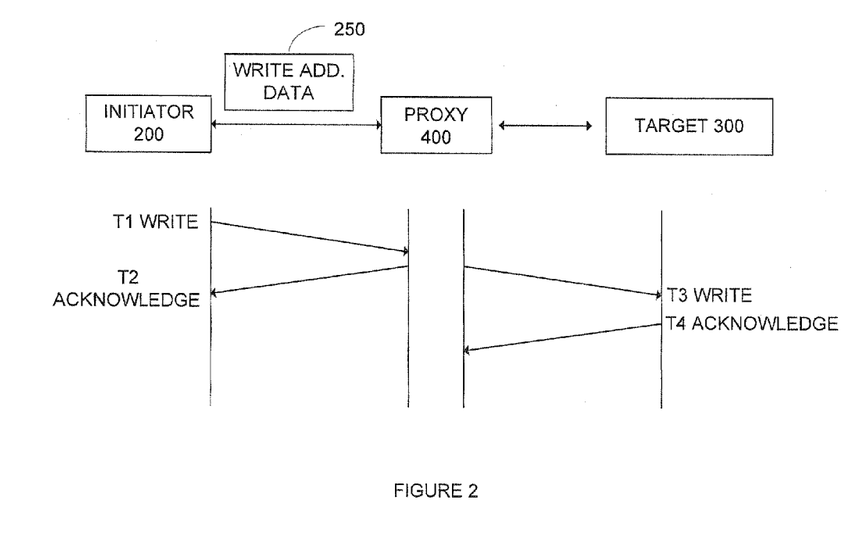
FIG. 2 is a timing diagram for a non-transparent proxy.

FIG. 2 shows a non-transparent proxy 400 that increases the bandwidth of write operations. The initiator 200 is any device or application that writes and reads data to and from another device. The target 300 is any device that stores data that is accessed by another device or application. The proxy 400 is any device residing between the initiator 200 and the target 300. An advantage of the non-transparent deployment is that the write acknowledgements can be returned to the initiators quickly, often more quickly than the original target is capable of. The proxy assumes the burden of assuring data consistency during the window of time between the initiator acknowledgement and the eventual receipt of the target acknowledgement.

The initiator 200, target 300, and proxy 400 could be directly connected together, or connected to each other through a network or fabric. For example, the initiator 200 could be a server, server application, router, switch, client computer, etc. The initiator 200 may also comprise a cache application used by an application operated on a storage server. In this example, the application may need to access data stored in target 300 responsive to communications with clients via a Wide Area Network (WAN) or Local Area Network (LAN) referred to generally as the Internet.

The target 300 could be a storage device or a storage server that contains an array of solid state memory devices and/or storage disks. The target 300 could be a standalone storage appliance, device, blade, or disk array. In this embodiment, the initiator 200, proxy 400, and target 300 may be coupled to each other via wired or wireless Internet connections. In another embodiment, the initiator 200 may access one or more disks in target 300 over an internal or external data bus. In another embodiment, target 300 is an abstraction of storage (such as a volume manager) potentially accessing physical storage on a plurality of local or remote targets.

In another embodiment, the initiator 200, proxy 400, and target 300 are all part of the same appliance that is located in a server or other computing device. In another example, any combination of the initiator 200, proxy 400, and target 300 may operate in different computing devices or servers. In other embodiments, the initiator 200 may be operated in conjunction with a personal computer, portable video or audio device, or some other type of consumer product. Of course these are just examples, and the system in FIG. 2 can operate in any computing environment and with any initiator application or device 200 that needs to write date to another target device 300.

In one embodiment, the times described in the timelines below correspond to times when associated write operations or acknowledge messages are received by the proxy 400. In other embodiments, the timestamps may be generated by the initiator 200, target 300, or the protocol used for sending messages between the initiator 200 and target 300.

The initiator 200 and target 300 connected through proxy 400 in FIG. 2 may see no operational difference but will incur improved behavioral performance, especially concerning a temporal sequence of events. The proxy 400 may receive a write request or write operation 250 from the initiator 200 at time T1. The write request 250 includes data and an address corresponding to a location in target 300. Instead of forwarding the write request 250 to target 300 and then waiting for an acknowledgement back from target 300, the proxy 400 may immediately send an acknowledgement back to the initiator at time T2. The proxy 400 then forwards the write operation 250 to the target 300 at time T3 and waits for an acknowledgement back from the target 300 at time T4.

The reduced time between the write operation at time T1 and the acknowledgement at time T2 allows the initiator 200 to write data at a faster rate. However, several consistency issues can arise from both faulty and fault-free transmission of the messages between the initiator 200, target 300 and proxy 400. In the case of the transparent proxy in FIG. 1, initiator 200 receives the acknowledgement at time T4 only after the proxy 100 receives an acknowledgment back from the target 300 at time T3.

However, the proxy 400 in FIG. 2 sends an acknowledgement back to initiator 200 at time T2 before the actual write within target 300 has completed. Between time T2 and the completion of the write operation at T4, the initiator 200 and target 300 have inconsistent views of the state of the storage device 300, potentially resulting in inconsistent data during read operations.

In the event of a transmission fault between proxy 400 and target 300, the write is retried by the proxy 400 until completed, since the initiator 200 has already received an acknowledgement. This requires the proxy 400 to store write operations 250 until such time as they have been acknowledged by target 300. Depending on the number of failed or delayed transmissions between proxy 400 and target 300, this may result in significant reordering of actual write operations within target 300 and significant storage and processing complexity within proxy 400.

As a result of this requirement, the performance of proxy 400 could potentially slow down write operations compared with a direct communication between initiator 200 and target 300. The proxy 400 uses a novel write buffering scheme that increases write bandwidth while at the same time ensuring data constancy between the initiator 200 and target 300.

Figure 3:
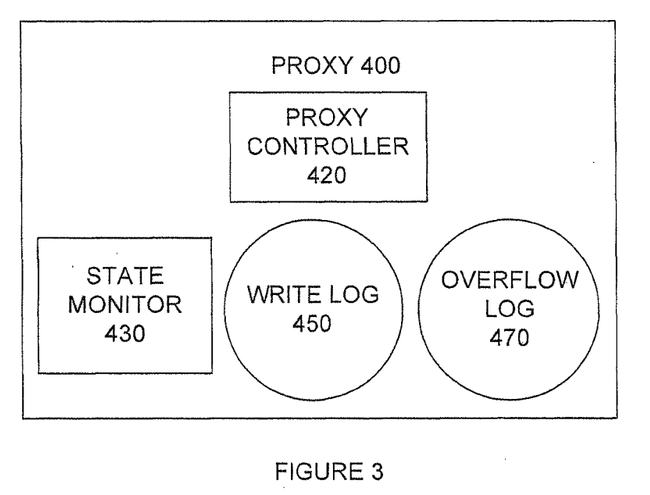
FIG. 3 is a block diagram of a storage proxy.

FIG. 3 shows the proxy 400 of FIG. 2 in more detail. A proxy controller 420, state monitor 430, write log 450, and overflow log 470 comprise any combination of logic circuitry and/or software configured to provide the operations described below. For example, the controller 420, monitor 430, and logs 450 and 470 can comprise one or more programmable microprocessors that execute programmable computer instructions, memory, buffers, registers and any other necessary logic circuitry.

Proxy controller 420 maintains protocol state and connection information among all initiators 200 and targets 300. For example, proxy controller 420 may abstract whatever communication protocol is being used, such as Transmission Control Protocol/Internet Protocol (TCP/IP), Internet Small Computer System Interface, (ISCSI), fiber channel, etc. into simple read and write operations. State monitor 430 tracks the unique state of every write operation among the initiators 200 and targets 300. Each write operation is uniquely identified with an identifier that can be correlated by the proxy controller 420 with an associated write address and associated write data. This identification need not be unique over indefinite operating time but guarantees that any and all in-flight write operations can be distinguished from each other and correctly ordered temporally.

Write log 450 or overflow log 470 hold a copy of the write data and write address for every write operation 250 from the initiator 200 until a corresponding acknowledgement is received back from the target 300.

Figure 4:
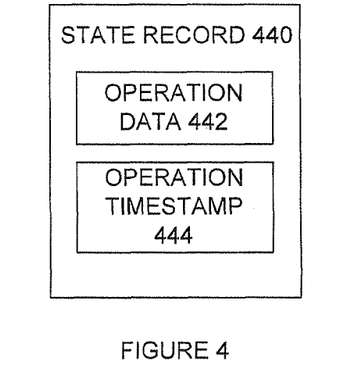
FIG. 4 is a block diagram showing a state record used in the proxy of FIG. 3.

For every write operation 250 sent by the initiator 200 in FIG. 2, proxy controller 420 requests state monitor 430 to initialize a state record 440. State record 440 consists of operation data 442 defined by proxy controller 420 and an operation timestamps 444 set by proxy controller 420. The timestamps may correspond to the times when the initiator 200 sends the write operation 250, the proxy 400 receives the write operation, and/or the proxy 400 sends or receives acknowledgments for write operations. Operation timestamp 444 is of sufficient granularity and accuracy so that two write operations 250 arriving back to back at the proxy 400 will have different timestamps values.

In one embodiment, operation timestamp 444 is an absolute time accurate to some interval less than half the minimum time between two write operations. As an example, for a minimum back to back write interval of 10 nanoseconds (ns), operation timestamp 444 would be accurate to less than 5 ns. In another embodiment, operation timestamp 444 is a relative timer counting some regular event, such as a bus clock or high-speed timer. In this embodiment, write operations are separated by at least two periods of the relative timer clock. In another embodiment, operation timestamp 444 is a combination of a relative timer and absolute timer such that the absolute timer is derived from the relative timer. In all embodiments, operation timestamp 444 will be unique for concurrent write operations from initiator 200.

Figure 5:
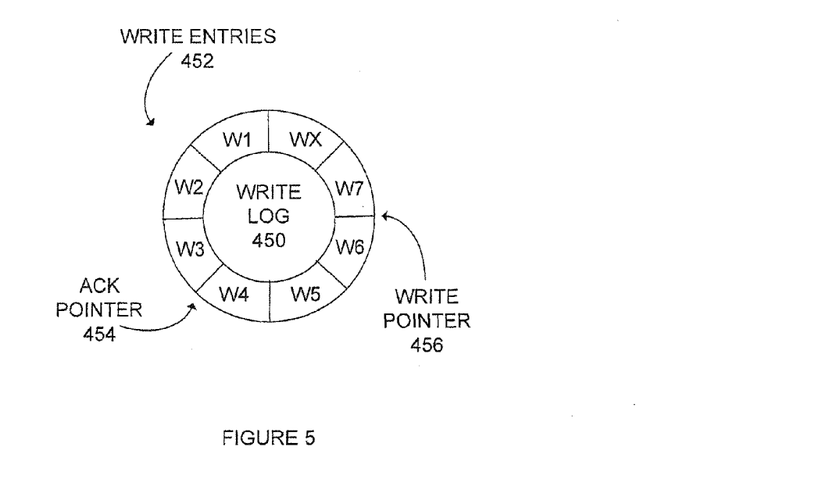
FIG. 5 is a diagram of a write log.

FIG. 5 shows how the proxy controller 420 stores information for each write operation W1-WX (W) from the initiator 200 into a write entry 452 of the write log 450. Alternatively, representations of the write operations W could be stored in the write log 450. The write entries 452 can each include any combination of a write address; write data, and a unique identifier of the particular write operation W. The write operations W are uniquely identified and buffered in write log 450 until the write operation W is acknowledged by target 300 as being successfully completed.

The write operations W are stored sequentially within the write log 450 corresponding with the order the write operations W1-WX were received by proxy 400. For example, the write log 450 can be configured as a First In-First Out (FIFO) buffer. A first received write operation W1 is stored in a first write entry or "slot" 452 within write log 450, a second received write operation W2 is stored in a next sequential write entry 452 within write log 450, etc.

A write pointer 456 points to the next write entry 452 for writing the data for a next write operation into write log 450. An acknowledgement (ACK) pointer 454 is advanced each time a write acknowledgement for a currently referenced write operation W is received back from the target 300. In FIG. 5, the ACK pointer 454 is currently pointing to write operation W4 and will not advance to the next write entry until the ACK for write operation W4 is received back from the target 300.

The ACK pointer 454 typically points to the write operation W that has resided within the write log 450 for the longest period of time. The number of write entries 452 between write pointer 456 and ACK Pointer 454 correspond with the number of pending write operations W that have been forwarded to the target 300 by proxy 400 but have not yet received acknowledgements back from the target 300. FIG. 5 shows that write operations W6, W5, and W4 have not yet received acknowledgments from the target 300.

The number of write entries 452 in write log 450 is configurable. In one embodiment, the number of write entries 452 can vary during operation to some upper limit. In another embodiment, the number of write entries 452 is fixed during normal operation after initialization. In one embodiment, the size of write entries 452 is fixed such that write operations W greater than a particular size are split over multiple write entries 452. In another embodiment, the size of each write entry 452 is variable and can be made to accommodate any write operation W size.

In another embodiment, multiple write operations W from initiator 200 are grouped by the proxy 400 and sent as a single write block operation to target 300. For example, co-pending U.S. patent application Ser. No. 12/759,644, filed on Apr. 13, 2010; and co-pending U.S. patent application Ser. No. 12/759,604, filed on Apr. 13, 2010 are both herein incorporated by reference, and explain schemes for mapping data from multiple write operations into a same larger data block and writing the larger data block into a disc storage array. Each writes entry 452 can be associated with one of these larger data blocks that contain multiple smaller write blocks.

It should also be noted that the write entries 452 in write log 450 may be stored and processed sequentially. This may more efficiently write data to target 300 and enable easy sequential tracking of each ACK received back from the target 300. Since reads from the write log 450 are relatively infrequent, slower memory devices can be used for write log 450 without degrading performance. Such reads would occur only in the event that an acknowledgement is not received before the write log is filled.

Write log 450 may eventually fill up all write entries 452 and write pointer 456 will advance to the original starting position and point to a write entry that was previously or is currently buffering write operation W1. Two conditions may occur. If ACK pointer 454 has advanced beyond the write operation W1, the write entry containing W1 may be reused. However, the target 300 must acknowledge the write operation W1 in order for the ACK pointer 454 to advance past the write entry containing W1. Reuse can be achieved through overwriting as the data in W1 is not of interest once the acknowledgement has been received.

Provided a sufficient initial number of total write entries 452, this first case will be the most common (the second case "Write Log Overflow" is described in detail subsequently). For example, by the time write pointer 456 reaches the write entry containing W1, the proxy 400 will typically have already received the ACK back from target 300 for write operation W1. The ACK pointer 454 will have then already moved to the next longest residing write operation W in write log 450 still waiting to be acknowledged by target 300. Accordingly, the contents of write operation W1 are overwritten with the contents of a next write operation received from initiator 200 when the write pointer 456 reaches the write entry containing W1.

The write pointer 456 then moves to the next write entry currently or previously containing W2, and the ACK pointer 454 continues to move to the write entry 452 containing the next write operation W waiting to be acknowledged by the target 300. Thus, in normal operating conditions, the ACK pointer 454 leads the write pointer 456 through the write entries 452 in write log 450. After all of the write entries 452 have been filled, the proxy 400 starts back at the first write entry and starting writing over the write data that has already been acknowledge by the target 300. Under conditions where no acknowledgements are significantly delayed or lost, the write log would experience continuous sequential writing with no read activity.

Write Log Overflow

Figure 6:
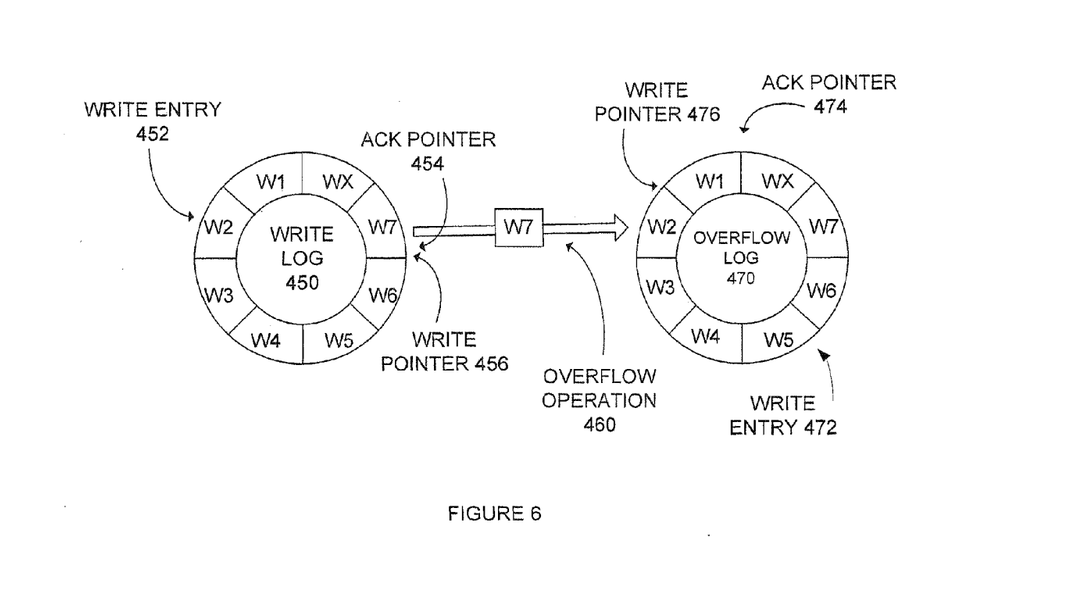
FIG. 6 is a diagram showing the write log of FIG. 5 used in conjunction with an overflow log.

Referring to FIG. 6, the write pointer 456 reaches the location of ACK pointer 454 at write operation W7. This means the write operation W7 is on the verge of timing out or being overwritten by the next write operation from initiator 200. Typically, the write pointer 456 would only catch the ACK pointer 454 when the acknowledgement from target 300 for write operation W7 is not successfully received by target 300. To prevent the data in write operation W7 from being overwritten and to prevent stalling the write operations from initiator 200, the proxy 400 writes the data for write operation W7 into overflow log 470. This frees up the bottleneck in write log 450 caused by write operation W7.

Overflow log 470 is similar to write log 450 in that a write pointer 476 points to a next write entry 472 for buffering a write operation and an ACK pointer 474 points to the longest pending non-acknowledged write operation. Overflow operation 460 copies the write operation W7 from write log 450 into the next available write entry in overflow log 470 referenced by write pointer 476. Overflow operations 460 are infrequent and typically occur during write errors. Therefore the necessary write rate for overflow log 470 is significantly lower than the write rate for write log 450. Accordingly, slower memory devices could be used in overflow log 470 and a fast write rate still maintained for initiator 200.

The write operations W associated with write errors and/or delays are copied to overflow log 470 to make room in write log 450 for new write operations. The write operations W copied into overflow log 470 are buffered until the proxy controller 420 successfully receives an associated acknowledge back from the target 300. The proxy controller 420 may retry the same write operation multiple times until the corresponding acknowledge is received back from target 300. In another embodiment, a write retry operation is performed only once per cycle of write pointer 476 through overflow log 470. Upon receiving the acknowledgement back from the target 300, the ACK pointer 474 is advanced allowing the corresponding write entry 472 to be reused.

The size of the write log 450 and the overflow log 470 and the number of corresponding write entries can be configured according to the required bandwidth for initiator write operations. For example, a higher write bandwidth may require a larger number of write entries. In one embodiment, the overflow log 470 is implemented hierarchically as multiple levels of functionally identical logs. In another embodiment, overflow log 470 consists of a single FIFO buffer structure.

The number of writes entries 452 allowed between the ACK pointer 454 and write pointer 456 before the overflow operation 460 is initiated can also be configurable. For example, the write log 450 may conduct an overflow operation 460 when there are five or fewer write entries 452 between the ACK pointer 454 and the write pointer 456. This provides the write log 450 with enough time to move a problem write operation W7 to the overflow log 470 before the write pointer 456 reaches the ACK pointer 454 and stalls other write operations from the initiator 200.

Figure 7:
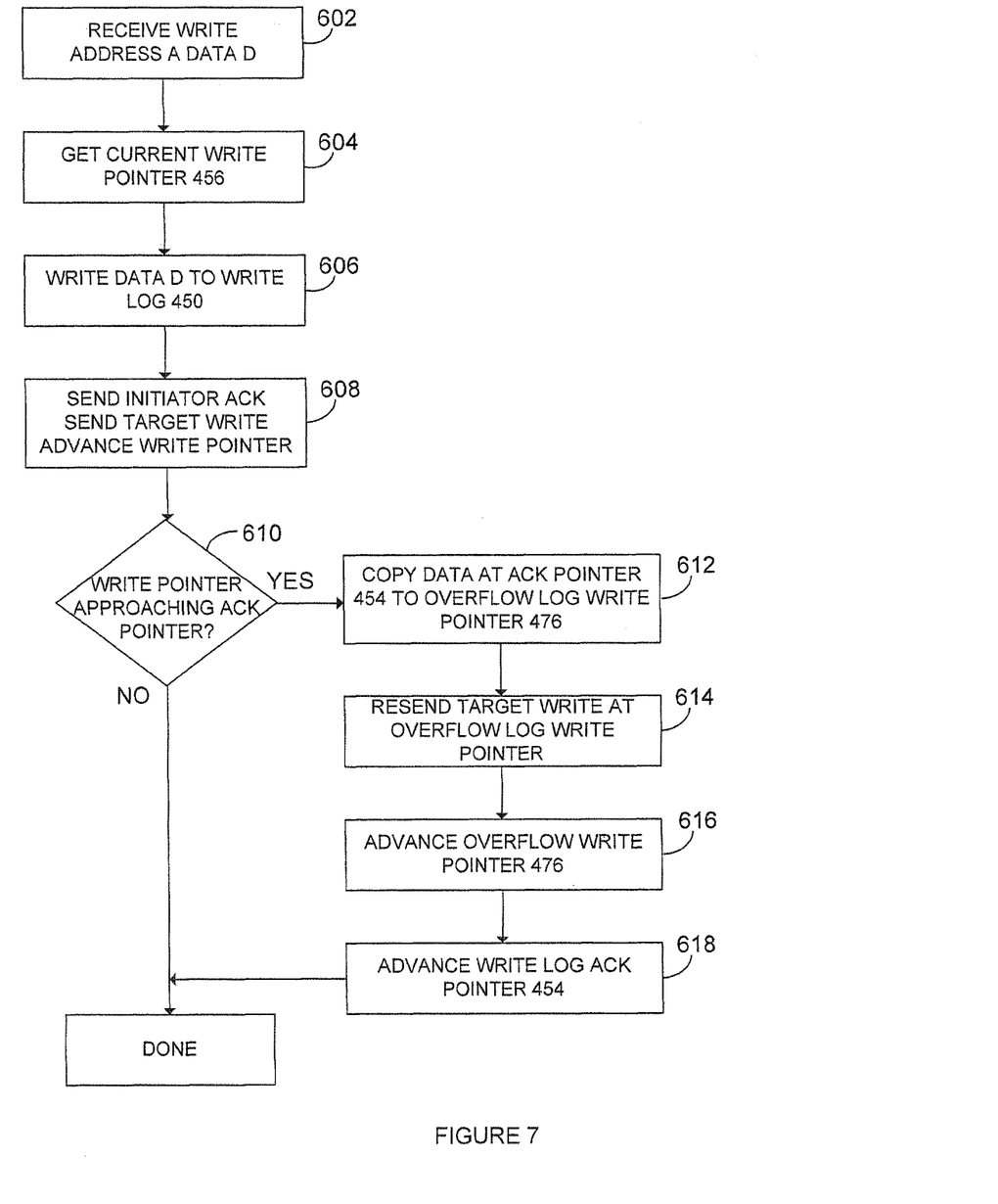
FIG. 7 is a flow diagram showing how the write log and overflow log of FIG. 6 are used during a write operation.

FIG. 7 explains the operations performed by the proxy 400 during a write operation. Referring to FIGS. 6 and 7, in operation 602 the proxy controller 420 receives a write operation from the initiator 200. The write operation includes an address A and data D. The proxy controller 420 in operation 604 identifies the current location of write pointer 456 and in operation 606 buffers the data D from the write operation into the write entry 452 in write log 450 corresponding with the write pointer 456. The proxy controller 420 in operation 608 sends an acknowledgement back to the initiator 200 and forwards the write operation to the target 300. The write pointer 456 is then advanced to the next write entry 452 in write log 450.

In operation 610 the proxy controller 420 determines if the write pointer 456 is within some number of write entries 452 of the ACK pointer 454. If not, the proxy controller 420 moves back to operation 602 and processes the next write operation from the initiator 200. If the write pointer 456 is approaching the ACK pointer 454 in operation 610, the proxy controller 420 in operation 612 moves the data for the write operation currently referenced by the ACK pointer 454 to a location in overflow log 470 referenced by write pointer 476.

The proxy controller 420 in operation 614 also resends the write operation at write pointer 476 to the target 300. The overflow write pointer 476 is then advanced in operation 616 to a next write entry 472. In operation 618 the ACK pointer 454 in write log 450 is advanced to the next write entry 452. The proxy controller 420 then goes back to operation 602 and processes the next write operation from the initiator 200.

Figure 8:
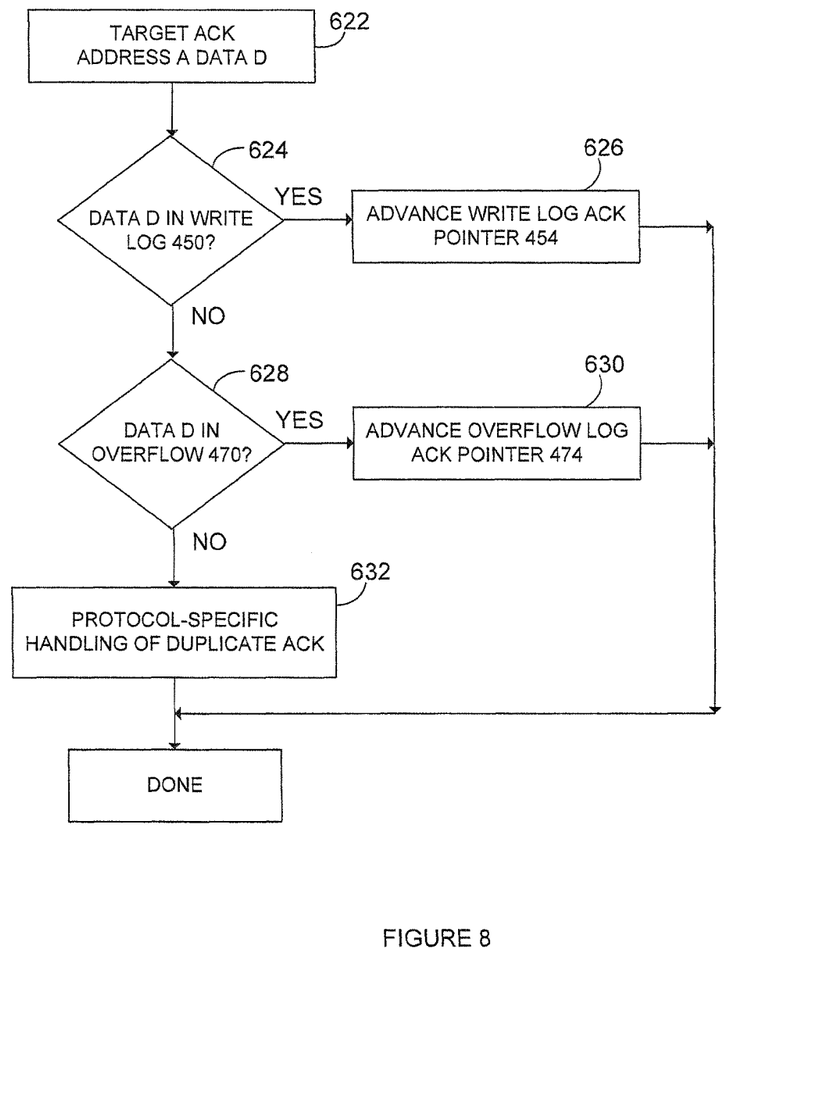
FIG. 8 is a flow diagram showing how the write log and overflow log of FIG. 6 are used during a write acknowledge.

FIG. 8 is a flow diagram describing in more detail how the proxy controller 420 manages the write log 450 and the overflow log 470 responsive to a write acknowledgment back from the target 300. In operation 622 the proxy controller 420 receives a write acknowledge back from the target 300 for the write operation requesting data D be written into address location A.

The proxy controller 420 in operation 624 looks in the write log 450 for the data associated with the write acknowledge from target 300. If located in write log 450, the proxy controller 420 in operation 626 advances the ACK pointer 454 to the next write entry 452. If the write operation associated with the acknowledge for target 300 is located in the overflow log 470 in operation 628, the proxy controller 420 in operation 630 advances the ACK pointer 474.

In operation 632 the acknowledgment from the target 300 may not have a corresponding write entry in either the write log 450 or overflow log 470. This could happen when the proxy controller 420 sends out multiple write requests to the target 300 for a previously non-acknowledged write operation. In this situation, the target 300 may provide delayed acknowledgments to each of the multiple write requests. The proxy controller 420 may invalidate the write data D after the first acknowledge. Therefore, no valid write entry will exist in the write log 450 or the overflow log 470 for the subsequent acknowledgements from target 300. A particular communication protocol used between the proxy 400 and target 300 may be used for handling repetitive acknowledgments in operation 632. For example, the communication protocol may simply have the proxy controller 420 ignore the additional acknowledgements.

The proxy 400 may receive write operations W1-W4 from initiator 200 and buffer the write operations W1-W4 in sequential write entries 452 of the write log 450. The proxy controller 420 may then immediately forward the write operations W1-W4 in the same sequentially received order to the target 300.

Referring back to FIG. 5, the proxy controller 420 may receive the acknowledgements for the write operations W4-W6 back from the target 300 out of order. For example, the acknowledgements for write operations W5 and W6 may be received back from the target 300 before the acknowledgement for write operation W4.

Assume the ACK pointer 454 in FIG. 5 is currently pointing to write operation W4. The proxy controller 420 must wait for the acknowledgement for W4 before moving ACK pointer 454. However, the acknowledgements for W5 and W6 have already been received. When the proxy controller 420 does receive the acknowledgement for W4, the ACK pointer 454 can skip over W5 and W6 to W7.

Figure 9:
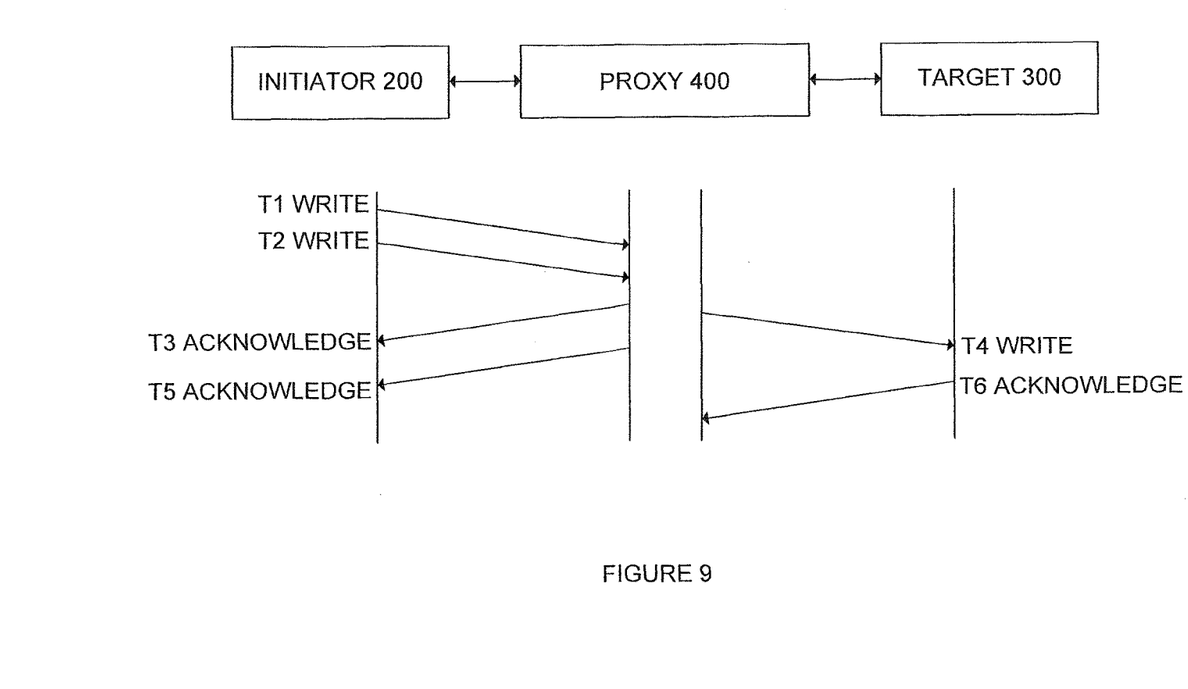
FIG. 9 is a timeline showing how the proxy of FIG. 4 batches write operations.

FIG. 9 shows another timeline for the proxy 400. In this example, the initiator 200 sends a first write operation having an associated write data and an associated write address at time T1. The initiator 200 sends a second write operation at time T2 that includes different write data and a different associated write address. The proxy 400 sends separate acknowledgements at times T3 and T5 back to the initiator 200 corresponding to the write operations at times T1 and T2, respectively.

Instead of forwarding two separate write operations to target 300, the proxy 400 may combine the two write operations received at times T1 and T2 into a single write operation and send the combined write operation to target 300 at time T4. This may correspond to the block data writes that were discussed above where the data from multiple different write operations are stored as data blocks and written into target 300 as one larger contiguous data block. These single contiguous write operations can improve the overall write throughput to target 300. The proxy controller 420 is then only required to manage a single write entry in write log 450 and only has to process a single acknowledgement back from the target 300 at time T6. Of course, other write bundling schemes can also be used by the proxy 400.

Figure 10:
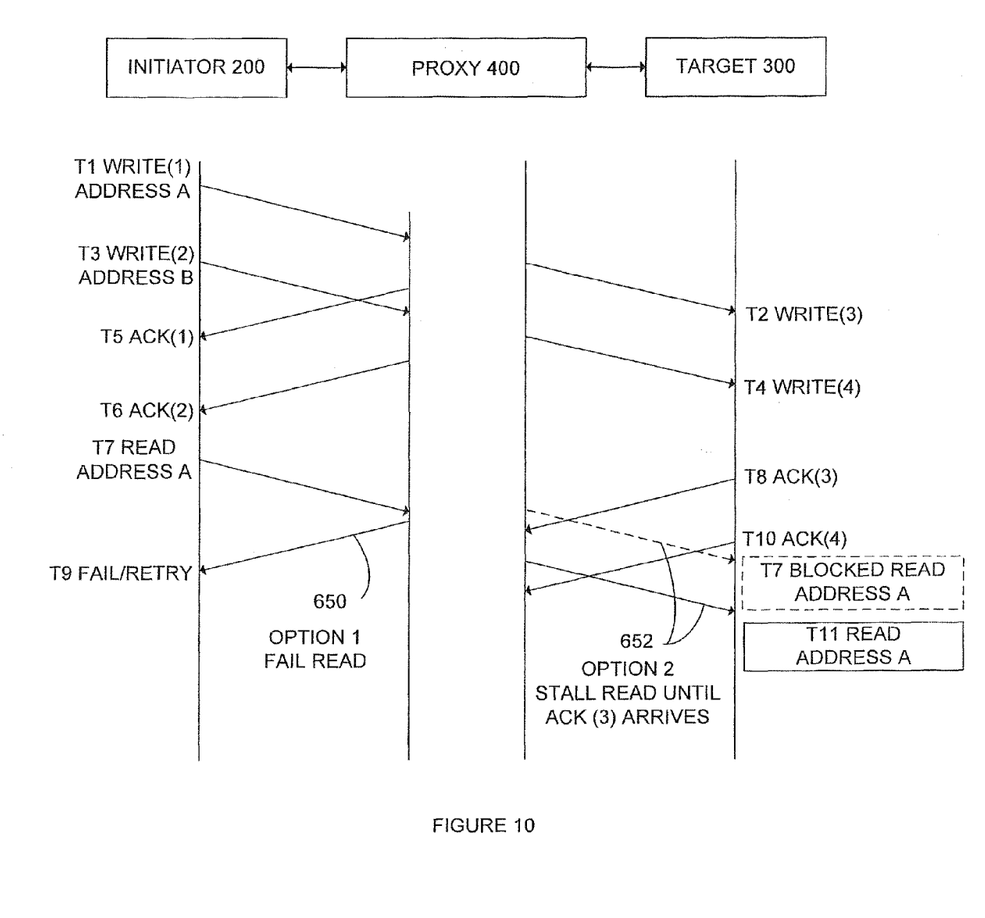
FIGS. 10 and 11 are timelines showing how the proxy of FIG. 4 maintains data consistency for delayed write acknowledgements.

FIG. 10 shows how the proxy controller 420 uses the timestamps 444 in state record 440 of FIG. 4 to determine the correct behavior for different potential race conditions. Write operations Write (1) and Write (2) occur at times T1 and T3, respectively. The write operations Write (1) and Write (2) are directed to address locations A and B within target 300, respectively. As mentioned above, the timestamps shown in the figures may correspond to the time when the associated write operation or acknowledge message is received by the proxy 400. In other embodiments, the timestamps may be created by the initiators 200, targets 300, and/or the communication protocol used between the different elements.

The write operations Write(1) and Write(2) are forwarded by the proxy 400 to target 300 as write operations Write(3) and Write(4) at times T2 and T4, respectively. The proxy 400 also sends acknowledgements ACK(1) and ACK(2) for write operations Write(1) and Write(2) back to the initiator 200 at times T5 and T6, respectively. At this point the initiator 200 believes the two write operations Write (1) and Write (2) have been successfully written into target 300.

At a subsequent time T7, a read is performed to the address location A in target 300 that corresponds with the previous write operation Write(1). However, the ACK (3) corresponding to write operation Write (1) has not yet been received by the proxy 400 from target 300. Therefore, the read operation to address A at time T7 may reference data that is not yet been successfully stored in target 300. The proxy 400 could forward the read operation to the target 300. However, if the write operation Write(3) between proxy 400 and target 300 failed, the initiator 100 would receive data back from target 300 than is inconsistent with the data contained in previous write operation Write(1). Until the acknowledgement of Write(3) has been received, no reads to the storage impacted by Write(3) may be forwarded to target 300.

To prevent data inconsistency between the initiator 200 and target 300, the proxy 400 can either fail or delay the read operation at time T7. For example, the proxy 400 at time T9 may send a read failure or read retry message 650 back to the initiator 200. This would likely cause the initiator 200 to resend the read request for the data at address A. By the time initiator 200 sends the read retry, the proxy 400 may have received the acknowledgement ACK (3) back from the target 300 at time T8. Accordingly, data at address A in target 300 will now be consistent with the data in write operation Write (1) sent by the initiator 200 at time T1. The proxy 400 could then forward the read request to the target 300.

Alternatively, the proxy 400 may delay forwarding the read operation 652 to the target 300 until a time T11 after the ACK (3) associated with data at address A is received back from the target 300 at time T8. This ensures the forwarded read operation 652 will read the same data in target 300 that was originally contained in the write operation Write (1) at time T1. User data security requirement may prevent the read operation at time T7 from being served from any caching or tiering elements within proxy 400 until ACK(3) is received even though the data is (minimally) present within the write log. An application on initiator 200 may depend on such a read to allow other initiators (not attached through proxy 400) to access the storage of target 300.

Figure 11:
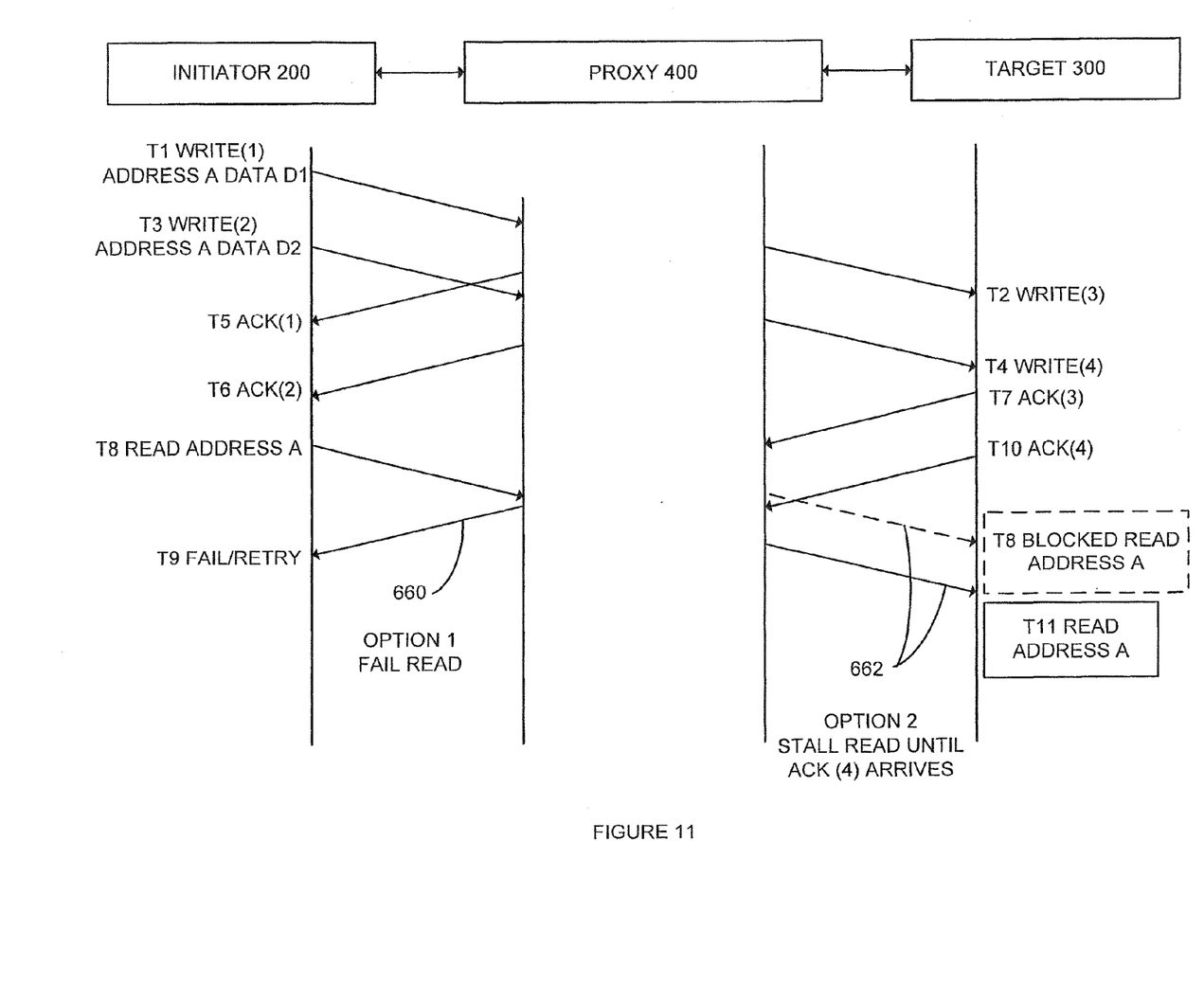

FIG. 11 shows how the proxy controller 420 uses the timestamps 444 in state record 440 of FIG. 4 to provide consistent data during another potential race condition. Write operations Write (1) and Write (2) occur at times T1 and T3, respectively. The write operations Write (1) and Write (2) write data D1 and D2 into the same address location A.

The write operations Write(1) and Write(2) are forwarded by the proxy 400 to target 300 as write operations Write(3) and Write(4) at times T2 and T4, respectively. The proxy 400 also sends acknowledgements ACK(1) and ACK(2) back to the initiator 200 at times T5 and T6 for write operations Write(1) and Write(2), respectively. At this point, the initiator 200 believes both write operations Write (1) and Write (2) were successfully completed by the target 300.

At a time T7 the proxy 400 receives the ACK (3) back from the target 300 associated with the first write operation Write (1). However, the proxy 400 receives a read operation to address A at time T8 before receiving the ACK (4) associated with the data D2 that was subsequently written into address A. Therefore, the read operation at time T8 requests the data D2 that has not yet been acknowledged as successfully stored in target 300. If the proxy 400 forwarded the read operation to target 300 and write operation Write (4) failed, the initiator 200 would receive back data D1 instead of expected data D2.

To prevent data inconsistency between the initiator 200 and target 300, the proxy 400 either fails or delays the read operation. For example, the proxy 400 at time T9 may send a read failure or read retry message 660 back to the initiator 200. This would cause the initiator 200 to resend the read request for address A. By the time the initiator 200 performs the read retry, the acknowledgement ACK (4) for data D2 may have been received by the proxy 400. Forwarding the read request to target 300 would then provide the data D2 that correctly corresponds to the previous write operation Write (2).

Alternatively, the proxy 400 may delay forwarding the read operation 662 to the target 300 until a time T11 after the ACK (4) associated with data D2 is received back from the target 300 at time T10. This ensures that the forwarded read operation 662 will correctly read the data D2 from address A in target 300 that corresponds with the previous write operation Write(2).

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features can be implemented by themselves, or in combination with other operations in either hardware or software.

Having described and illustrated the principles of the invention in a preferred embodiment thereof, it should be apparent that the invention may be modified in arrangement and detail without departing from such principles. Any modifications and variation coming within the spirit and scope of the present invention are also claimed.

The invention claimed is:

1. A proxy device, comprising:
a write log configured to buffer data for write operations while waiting for acknowledgements of the write operations from a storage device;
a write pointer configured to identify write entries in the write log for storing the data;
an acknowledge pointer configured to track the write operations that have received acknowledgments back from the storage device; and
a processor configured to select the write entries for storing the data for the write operations according to the write pointer and acknowledge pointer, wherein the processor is configured to copy the data currently referenced by the acknowledge pointer into an overflow log when the write pointer comes within a given position of the acknowledge pointer, wherein the controller processor is further configured to operate a second write pointer that identifies a next entry in the overflow log for storing the data from the write log, and a second acknowledge pointer that identifies an overflow entry containing the data for a longest pending one of the write operations in the overflow log.

2. The proxy device according to claim 1 wherein the processor is configured to move the acknowledge pointer when one of the acknowledgments is received for one of the write operations currently referenced by the acknowledge pointer.

3. The proxy device according to claim 2 wherein the processor is configured to move the write pointer to a next write entry in the write log for each received write operation.

4. The proxy device according to claim 3 wherein the processor is configured to prevent the write pointer from moving past the acknowledge pointer.

5. The proxy device according to claim 1 wherein the processor is configured to use the write log for high bandwidth write operations and copy the data associated with delayed write operations into the overflow log.

6. The proxy device according to claim 5 wherein the processor is configured to resubmit the write operations to the storage device when the data for the write operations is copied into the overflow log.

7. The proxy device according to claim 1 wherein the processor is further configured to receive write operations containing data, receive read operations for the same data, and delay or block the read operations until acknowledgments for the write operations have been received back from the storage device.

8. The proxy device according to claim 1 including a first interface coupled to at least one initiator device over a fiber channel and a second interface couple to the storage device over the fiber channel.

9. An apparatus, comprising:
a processor configured to:
operate as a proxy for receiving write operations from initiator devices on behalf of a storage device and forwarding the write operations to the storage device that executes the write operations;
buffer data for the write operations into a write log while waiting for acknowledgments from the storage device indicating successful completion of the write operations forwarded by the processor;

copy the data from the write log to an overflow log based on an amount of the data in the write log;

invalidate data in the write log in response to the acknowledgements received from the storage device indicating successful execution of the write operations associated with the data in the write log; and invalidate data in the overflow log in response to the acknowledgements received from the storage device indicating successful execution of the write operations associated with the data in the overflow log.

10. The apparatus of claim 9 wherein the processor is further configured to;

forward the write operations to the storage device; and resend the write operations to the storage device in response to copying the data associated with the write operations to the overflow log.

11. The apparatus according to claim 9 wherein the processor is configured to operate a first write pointer that identifies a next entry in the write log for storing the data for a next received one of the write operations, and a first acknowledge pointer that identifies a second entry containing the data for a longest pending one of the write operations in the write log.

12. The apparatus according to claim 11 wherein the processor is configured to copy the data in the second entry into the overflow log when the first write pointer is about to reach the first acknowledge pointer.

13. The apparatus according to claim 9 wherein the processor is further configured to detect a read operation for data contained in a previously received one of the write operations, wherein the proxy device is configured to delay or block the read operation until the previously received one of the write operations is acknowledged by the storage device.

14. An apparatus, comprising:

a processor configured to operate as a proxy for write operations between initiator devices that initiate write operations and a storage device that executes the write operations;

a write log configured to buffer data for the write operations while the processor waits for acknowledgments from the storage device; and an overflow log, wherein the processor is configured to copy the data from the write log to the overflow, wherein the processor is configured to operate a second write pointer that identifies a next entry in the overflow log for storing the data from the write log, and a second acknowledge pointer that identifies an overflow entry containing the data for a longest pending one of the write operations in the overflow log.

15. The apparatus according to claim 14 wherein the processor is configured to resubmit the write operations to the storage device when the data associated with the write operations is copied from the write log into the overflow log.

16. A non-volatile computer-readable storage device comprising executable instructions that, in response to execution by a computing device, cause the computing device to:

receive a write operation;

log data from the write operation into a write log;

forward the write operation to a storage system;

monitor for an acknowledge of the write operation from the storage system;

write over the data in the write log after an acknowledge is received from the storage system;

copy the data for the write operation into an overflow;

receive the acknowledge for the write operation from the storage system;

advance a first acknowledge pointer for the write log when the data for the write operation is still located in the write log; and advance a second acknowledge pointer for the overflow log when the data associated with the write operation is located in the overflow log.

17. The non-volatile computer-readable storage device of claim 16, further comprising executable instructions configured to instruct a computing device to:

receive multiple write operations;

buffer data for the multiple write operations into a same entry in the write log;

send a single write request to the storage system for the multiple write operations;

overwrite the entry in the write log when the storage system acknowledges the write request.

18. A non-volatile computer-readable storage device comprising executable instructions configured to instruct a computing device to:

receive a write operation;

log data from the write operation into a write log;

copy the data for the write operation into an overflow log based on an amount of the data in the write log;

identify a write pointer for the overflow log;

write the data from the write operation into a write entry in the overflow log corresponding with the write pointer;

advance the write pointer;

advance an acknowledge pointer for the overflow log in response to receiving an acknowledge of the write operation; and write data for a subsequent write operation-into the write log in response to the acknowledge pointer for the overflow log reaching the write pointer.

* * * * *